USO05634698A

United States Patent [19]
Cao et al.

[11] Patent Number: 5,634,698
[45] Date of Patent: Jun. 3, 1997

[54] SYSTEM FOR CONTROLLING BRAKE PRESSURE BASED ON FUZZY LOGIC USING STEERING ANGLE AND YAW SPEED

[75] Inventors: Chi-Thuan Cao, Korntal-Muenchingen; Rolf Becker, Ditzingen; Ulrich Belzner; Thorsten-Wilhelm Moeller, both of Schwieberdingen, all of Germany; Bernd Lieberoth-Leden, Kyungki-Do, Rep. of Korea

[73] Assignee: Robert Bosch GmbH, Stuttgart, Germany

[21] Appl. No.: 391,809

[22] Filed: Feb. 21, 1995

[30] Foreign Application Priority Data

Feb. 19, 1994 [DE] Germany .................. 44 05 379.7

[51] Int. Cl.$^6$ ........................ B60T 8/32; B62D 6/00
[52] U.S. Cl. ............................ 303/146; 303/163
[58] Field of Search ..................... 303/146, 147, 303/165, 177, 168

[56] References Cited

U.S. PATENT DOCUMENTS 5,089,967  2/1992  Haseda et al. .................. 303/146
5,228,757  7/1993  Ito et al. ........................ 303/146
5,229,944  7/1993  Yasuno .......................... 303/146
5,416,709  5/1995  Yeh et al. ....................... 303/168
5,425,574  6/1995  Sand ............................. 303/177

FOREIGN PATENT DOCUMENTS 4041404  7/1991  Germany .................. 303/146

Primary Examiner—Matthew C. Graham
Attorney, Agent, or Firm—Felfe & Lynch

[57] ABSTRACT

An ABS which evaluates slip values prescribes pressure values for the wheel brakes. In order to improve the driving stability, these pressure values are varied by a brake controller using the deviation of the yawing speed from a set value and the front-axle steering angle as input variables. The brake controller determines its output values (variation values) with the aid of the fuzzy logic. Additionally, rear-axle steering is integrated into the system, the system partially also using fuzzy logic. Subsequently, an adaptation which is based on fuzzy logic and uses the brake controller and the rear-axle steering controller in a weighted fashion is proposed.

14 Claims, 7 Drawing Sheets

| Version | Oversteering | Understeering |
|---|---|---|
| 1 | RE-I underbraked (RE-O overbraked) | F-O underbraked (F-I overbraked) |
| 2 | F-O overbraked | RE-I overbraked |
| 3 | RE-I underbraked | RE-I overbraked |
| 4 | F-O overbraked | F-O underbraked |

Fig. 2

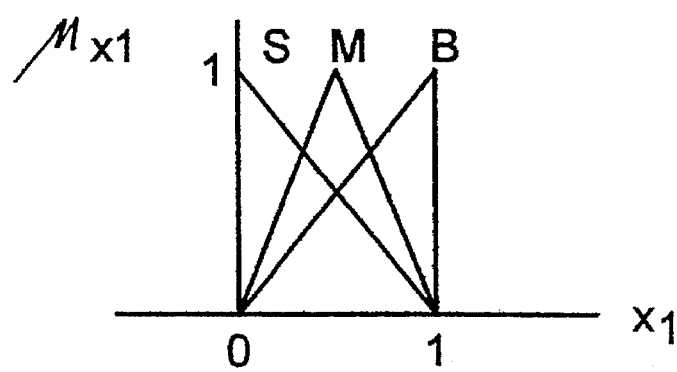
FIG. 11
FIG. 12
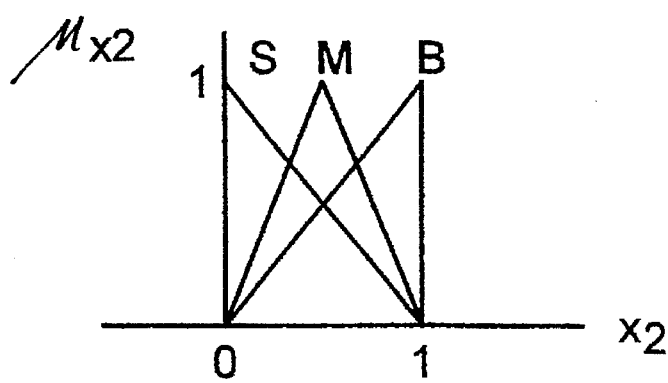
FIG. 13
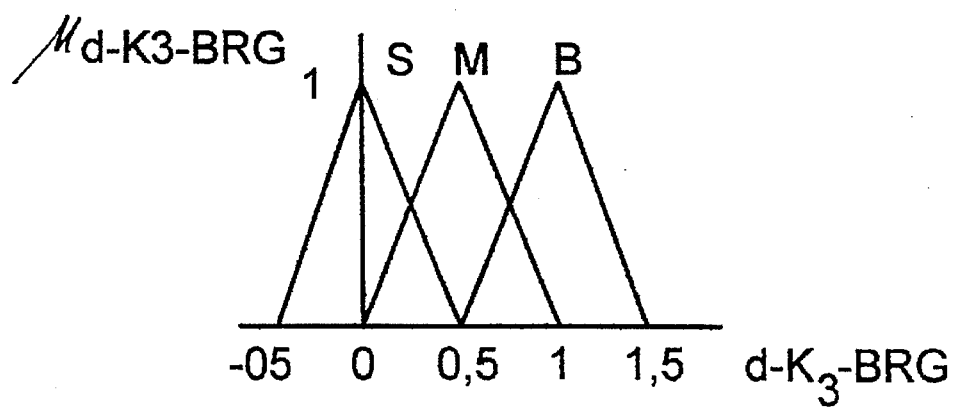
FIG. 14

SYSTEM FOR CONTROLLING BRAKE PRESSURE BASED ON FUZZY LOGIC USING STEERING ANGLE AND YAW SPEED

PRIOR ART

The invention relates to a vehicle dynamic control system which determines first desired brake pressures for the wheels by comparing desired slip values with actual slip values, and converting the first desired pressures to second desired pressures using the front axle steering angle and the yaw speed of the vehicle. Such a system is known from the paper "A New System for Independently Controlling Braking Force Between Inner and Outer Rear Wheels" by Nakazato et al published as SAE Paper 890835. The basic idea consists here in providing a device with which the stability and steerability can be ensured while simultaneously maintaining short braking distances during an ABS braking operation of a motor vehicle by means of individual application of the wheel brake pressure.

SUMMARY OF THE INVENTION

According to the invention, the first desired pressure is converted to the second desired pressure by means of a fuzzy logic controller, whereby a simplification of the vehicle dynamic control system is achieved. Furthermore, by means of the vehicle algorithms a microcomputer program which is capable of real time operation is obtained. Additionally, in a further embodiment of the invention, a rear-axle steering facility is integrated into the system, this facility likewise partially using fuzzy logic, and an adaptation which is based on fuzzy logic the uses and brake controller and the stabilizing component of the rear-axle steering system in a weighted fashion is proposed.

BRIEF DESCRIPTION OF THE DRAWINGS

FIG. 2 is a table of conditions which trigger brake invention;

FIG. 11 is a table of rules for determining output of the fuzzy adaptation,

FIG. 12 is a diagram for the input $X_1$ for the fuzzy adaptation;

FIG. 13 is a diagram for the input $X_2$ for the fuzzy adaptation;

FIG. 14 is a diagram of the output of the fuzzy adaptation.

Figure 1:
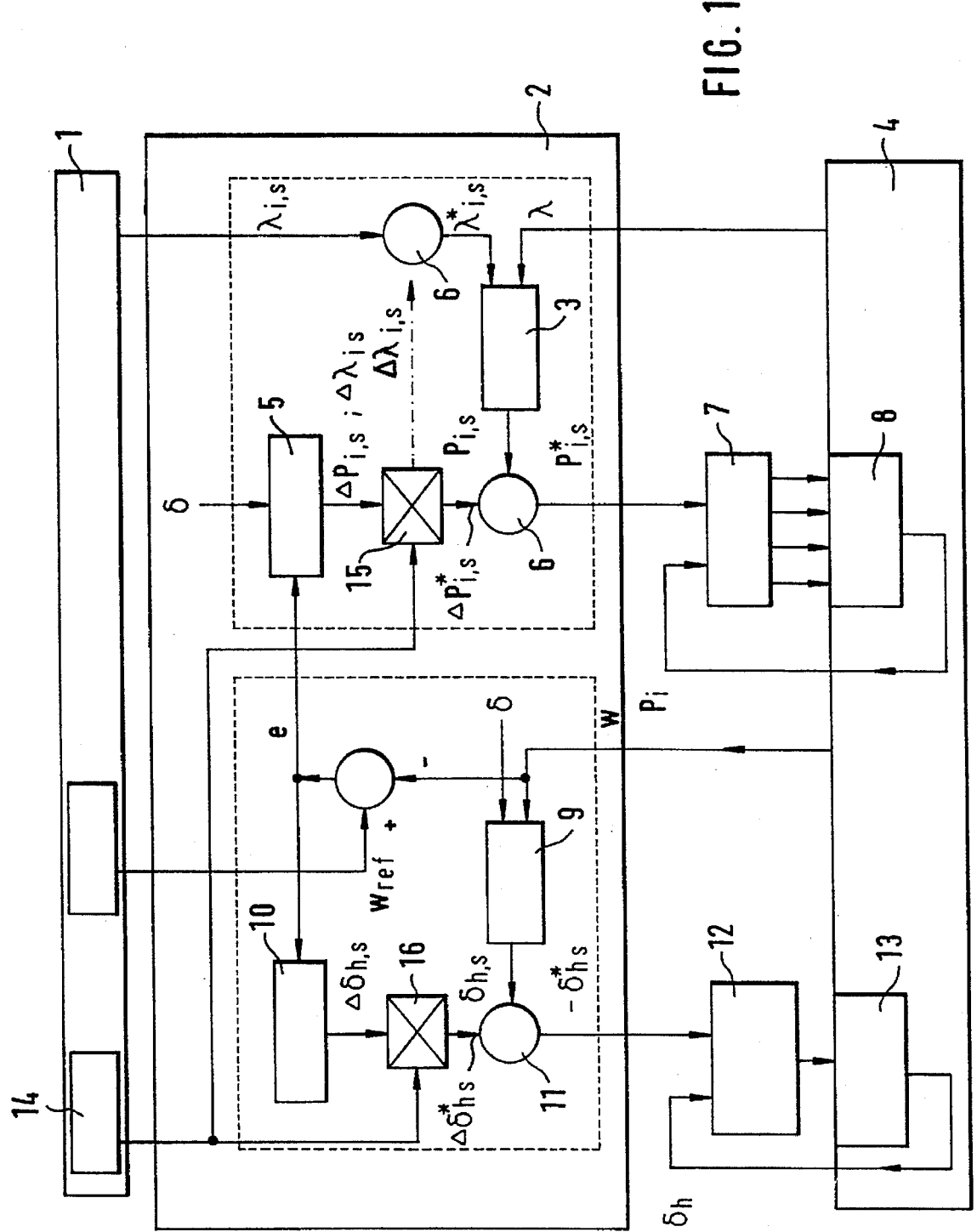
FIG. 1 is a block diagram of the vehicle dynamic control system.

The system illustrated is of hierarchical structure. At the highest coordination level it consists of a coordination block 1 which prescribes the desired values for an ABS controller and a rear-axle steering controller and also contains the adaptation which controls the weighting with which the stabilizing components of the controllers are included in the entire control. The desired values used are determined here experimentally or heuristically.

At the next level 2, an ABS slip controller 3 is provided as basic controller which processes desired slip values $\lambda_{is}$ from Block 1 and actual slip values $\lambda_i$ from the vehicle 4 (vehicle wheels i=1–4 not illustrated) and outputs set pressure values $P_{is}$. Additionally, a fuzzy logic brake controller 5 is provided to which the variables $e=W_{Ref}-w$ and $\delta$ are fed. W is the yawing speed, determined in the vehicle, about the vertical axis, $w_{Ref}$ is the desired yaw speed determined from the vehicle speed and the steering angle $\delta$ in the coordination block 1, and $\delta$ is the measured front-axle steering angle. Using the fuzzy logic, the brake controller 5 determines correction values $\Delta P_{is}$ which serve to stabilize the vehicle. The latter are superimposed on the set values $P_{is}$ of the ABS in an adder 6 so that set pressure values $P^*_{is}=P_{is}+\Delta P_{is}$ are produced. These and actual pressure values $P_i$ are fed to a pressure controller 7 which is provided at a third level, actuates brake control valves (in 8) for the brakes (in 8) and applies the set pressure.

As an alternative to $\Delta P_{is}$, the fuzzy logic brake controller can also output, as output variable, slip correction values $\Delta\lambda_{is}$ which are superimposed on the desired slip values $\lambda_{is}$ in an adder 6'. The ABS controller 3 then receives desired slip values $\lambda^*_{is}=\lambda_{is}+\Delta\lambda_{is}$ which it converts into desired pressure values $P_{is}$ to be fed to the pressure controller 7.

A rear-axle steering controller is provided in parallel, this being a model following controller including a control component 9 and a fuzzy logic steering controller 10. The yawing speed w and the steering angle $\delta$ are fed as input variables to the control component 9, only the variable e is fed to the fuzzy logic steering controller. The control component 9 determines a desired rear-axle steering angle $\delta_{hs}$ from the input variables w and $\delta$ in accordance with the following equation, the variables $h_{22}$, $h_{22v}$, $\Phi_{22ref}$, $h_{21ref}$, $\Phi_{22}$ and $h_{21}$ being vehicle-specific constants.

$$\delta_{hs}=(1/h_{22})\times(1/h_{22v})\times(\Phi_{22ref}w+h_{21ref}\delta-\Phi_{22}w-h_{21}\delta)$$

The fuzzy logic steering controller 10 produces a correction value $\Delta\delta_{hs}$ which is dependent on e and which is superimposed on the desired value of the control component 9 to form a new desired value $\delta^*_{hs}$.

$$\delta^*_{hs}=\delta_{hs}+\Delta\delta_{hs}$$

This desired value which is corrected in an adder 11 is fed to a position controller 12 which is arranged at the third level and to which the actual value $\delta_h$ of the position of the rear-axle steering $\delta_h$ is also fed and which adjusts the rear-axle steering facility by means of an actuator 13.

If both stabilizing controllers 5 and 10 are active, it is appropriate not to allow their influence to be completely effective but rather to perform a weighting. The weighting is performed by an adaptation device 14, operating with fuzzy logic, at the highest level, the adaptation device 14 outputting weighting factors to blocks 15 and 16 which lie between 0 and 1.

More details are now given on the brake control and on the rear-axle control.

The object of the brake control consists in stabilizing the vehicle in critical cases by means of counter torques which are produced by individual changes in brake pressure and brake slip.

In a normal case, in order to achieve shorter braking distances the slip controller attempts to maintain a desired optimum slip $\lambda_i$, and thus an optimum brake pressure $P_i$ for each wheel individually. However, for many driving maneuvers (such as μ split braking, braking during cornering or a jump in steering angle at a high speed) this brings about undesired rotational movements which can lead to instability of the vehicle (skidding, deviation from its course). With the aid of the fuzzy logic brake controller 5 it is intended to influence at least one wheel in a selective way by displacing the set slip ($\lambda_{is}$) or set pressure ($P_{is}$) so that the vehicle remains stable. The modified set slip $\lambda^*_{is}$ (set pressure $P^*_{is}$) is then, as already stated above, as follows $$\lambda^*_{is} = \lambda_{is} + \Delta\lambda_{is},$$

$$P^*_{is} = P_{is} + \Delta P_{is}$$

$\Delta\lambda_{is}$ and $\Delta P_{is}$ are formed by the evaluation of lateral-dynamic vehicle variables, namely the steering angle δ and the deviation of the yawing angle speed $e = w_{ref} - w$:

$$\Delta\lambda_{is} = f(\delta, e)$$

$$\Delta P_{is} = f(\delta, e)$$

It is possible to correct both the brake pressure with $\Delta P_{is}$ and the brake slip with $\Delta\lambda_{is}$.

Appropriately, the set slip is varied when there is an increase in pressure and the set pressure is varied when there is a decrease in pressure. This means:

$$\Delta\lambda_{is} > 0$$

$$\Delta P_{is} < 0$$

are used.

By means of the combination (δ, e) four driving states can be distinguished:

δ>0, e>0: understeering on the left
δ>0, e<0: oversteering on the left
δ<0, e>0: oversteering on the right
δ<0, e<0: understeering on the right Depending on the driving state, the wheels are under-braked or overbraked. In the table in FIG. 2 strategies and assignments of the brake interventions BRA are collated. F stands for front, RE for rear, L for left and R for right, I for inside and O for outside.

The fuzzy logic brake controller 5 produces the corresponding brake interventions BRA_F_I, BRA_F_O, BRA_RE_I, and BRA_RE_O from δ and e. Depending on δ the following applies:

| | | | |
|---|---|---|---|
| δ > 0 | : BRA_FL | = | BRA_F_I |
| | BRA_FR | = | BRA_F_O |
| | BRA_REL | = | BRA_RE_I |
| | BRA_RER | = | BRA_RE_O |
| δ < 0 | : BRA_FR | = | BRA_F_I |
| | BRA_FL | = | BRA_F_O |
| | BRA_RER | = | BRA_RE_I |
| | BRA_REL | = | BRA_RE_O |

Figure 3:
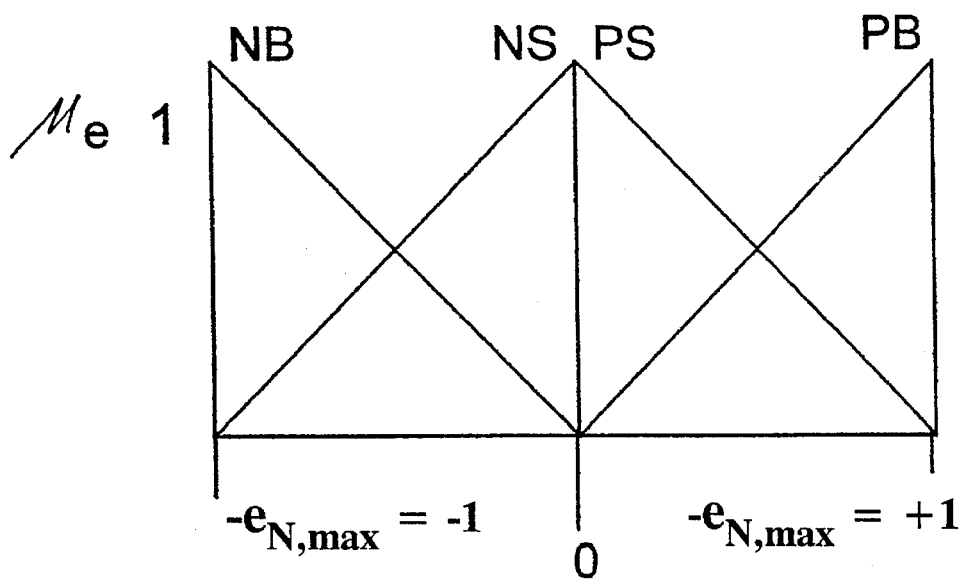
FIG. 3 is diagram for standardizing input e for the brake controller into four fuzzy symmetrical sets.

The input variable e is standardized according to FIG. 3 to a range between −1 and +1 ($e_N$) and divided into four fuzzy symmetrical sets:

NB=negative big
NS=negative small
PS=positive small
PB=positive big.

Figure 4:
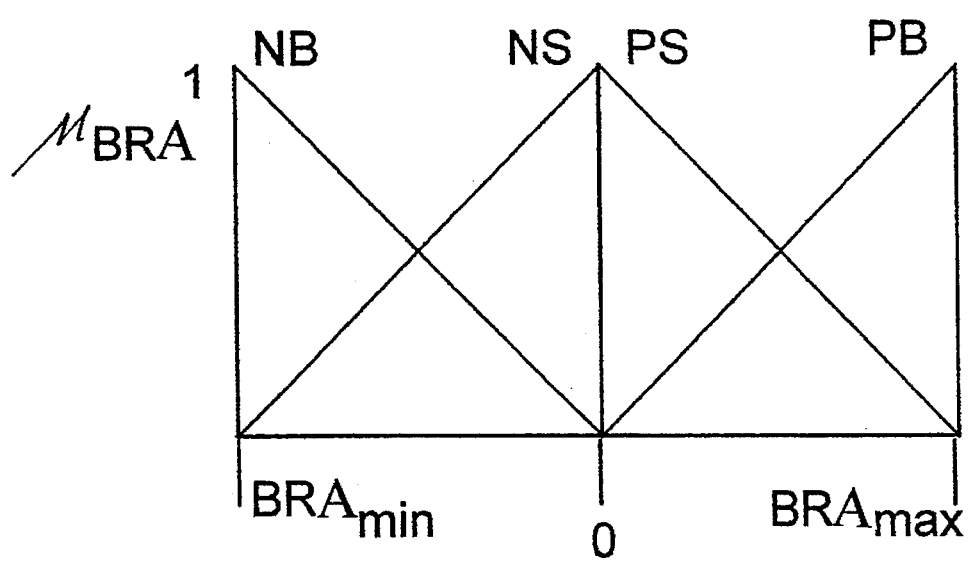
FIG. 4 is a diagram for standardizing output BRA into four fuzzy symmetrical sets.

The output variable BRA is standardized to a range $BRA_{min}$ and $BRA_{max}$ (FIG. 4, $BRA_N$) and also divided into four fuzzy symmetrical sets:

NB=negative big
NS=negative small
PS=positive small
PB=positive big.

The following relations apply between the physical and standardized variables:

$$e \cdot K_1\_BRG = e_N$$

$$BRA_N \cdot K3\_BRG = BRA$$

where $K_1\_BRG$ and $K3\_BRG$ are selected standardizing factors.

The following rules can be drawn up for the version 1 of the table in FIG. 2:

if δ > 0 and e = NB or δ < 0 and e = PB then
    BRA_F_I = NS
    BRA_F_O = NS
    BRA_RE_O = NB
    BRA_RE_O = PB if e = NS or e = PS then
    BRA_F_I = (NS or PS)
    BRA_F_O = (NS or PS)
    BRA_RE_I = (NS or PS)
    BRA_RE_O = (NS or PS)

if δ > 0 and e = PB or δ < 0 and e = NB then
    BRA_F_I = PB
    BRA_F_O = NB
    BRA_RE_I = PS
    BRA_RE_O = PS On the basis of the optimization over time the FUZZY_BRG is realized in analytical expressions as follows:
if (δ>0 and e<0) or (δ<0 and e>0) then $$BRA\_F\_I = 0$$

$$BRA\_F\_O = 0$$

$$BRA\_RE\_I = ((\mu_{PB})/(2-\mu_{PB})) \cdot r_{NB}$$

$$BRA\_RE\_O = ((\mu_{PB})/(2-\mu_{PB})) \cdot r_{PB}$$

and
if (δ>0 and e>0) or (δ<0 and e<0) then $$BRA\_F\_I = ((1-\mu_{NS})/(1+\mu_{NS})) \cdot r_{NB}$$

$$BRA\_F\_O = ((1-\mu_{NS})/(1+\mu_{NS})) \cdot r_{BP}$$

$$BRA\_RE\_I = 0$$

$$BRA\_RE\_O = 0$$

At the same time the following apply for the selected standardization $$r_{NB} = -0.667$$
$$r_{PB} = 0.667$$

$$\mu_{PB} = \begin{cases} e & e > 0 \\ -e & e < 0 \end{cases}$$

$$\mu_{NS} = \begin{cases} 1-e & e > 0 \\ 1+e & e < 0 \end{cases}$$

The following analytical expressions are obtained for the other strategies 2–4 in the table in FIG. 2:

|  | If ($\delta > 0$ and $e < 0$) or ($\delta < 0$ and $e > 0$) | If ($\delta > 0$ and $e > 0$) or ($\delta < 0$ and $e < 0$) |
|---|---|---|
| Version 2 | then<br>BRA_F_I = 0<br>BRA_RE_I = 0<br>BRA_RE_O = 0 | then<br>BRA_F_I = 0<br>BRA_F_O = 0<br>BRA_RE_O = 0 |
|  | $\text{BRA\_F\_O} = \dfrac{\mu_{PB}}{2-\mu_{PB}} \cdot r_{PB}$ | $\text{BRA\_RE\_I} = \dfrac{1-\mu_{NS}}{1+\mu_{NS}} \cdot r_{PB}$ |
| Version 3 | then<br>BRA_F_I = 0<br>BRA_F_O = 0<br>BRA_RE_O = 0 | then<br>BRA_F_I = 0<br>BRA_F_O = 0<br>BRA_RE_O = 0 |
|  | $\text{BRA\_RE\_I} = \dfrac{\mu_{PB}}{2-\mu_{PB}} \cdot r_{NB}$ | $\text{BRA\_RE\_I} = \dfrac{1-\mu_{NS}}{1+\mu_{NS}} \cdot r_{FB}$ |
| Version 4 | then<br>BRA_F_I = 0<br>BRA_RE_I = 0<br>BRA_RE_O = 0 | then<br>BRA_F_I = 0<br>BRA_RE_I = 0<br>BRA_RE_O = 0 |
|  | $\text{BRA\_F\_O} = \dfrac{\mu_{PD}}{2-\mu_{PD}} \cdot r_{PD}$ | $\text{BRA\_F\_O} = \dfrac{\mu_{PD}}{2-\mu_{PB}} \cdot r_{NB}$ | where:  $r_{NB} = -0.667$ $r_{PB} = 0.667$ $e = w_{ref} - w$ $\mu_{PB} = \begin{cases} e & e > 0 \\ -e & 3 < 0 \end{cases}$ $\mu_{NB} = \begin{cases} 1-e & e > 0 \\ 1+e & e < 0 \end{cases}$ The above values for BRA now still have to be converted with the aid of the sign of the steering angle $\delta$ into braking intervention values, e.g. BRA_FL, assigned to the wheels. This then results in the values for $\Delta\lambda_{is}$, and/or $\Delta P_{is}$.

More details are now given on the rear axle controller. It is a model following controller with the control component 9 and the fuzzy logic steering controller 10. The following is formed $$\delta_{hs}^* = \delta_{hs} + \Delta\delta_{hs}$$

The control component is obtained from the steering angle at the front $\delta$ and the yawing angle speed w as:

$$\delta_{hs} = (1/h_{22}) \cdot (1/h_{22v}) \cdot (\Phi_{22ref} w + h_{21ref}\delta - \Phi_{22}w - h_{21}\delta).$$

The fuzzy logic steering controller 10 is either a fuzzy logic P controller or a fuzzy PD controller. The fuzzy logic controller evaluates the deviation of the yawing angle speed e and produces, according to specific rules, the control variable $\Delta\delta_{hs}$:

$$\Delta\delta_{hs} = f(w_{ref} - w)$$

The justification for such a combination can be explained as follows. On the basis of a single-track model the following difference equation is obtained for the yawing angle speed:

$$w(k+1) = \Phi_{22}w(k) + h_{21}\delta(k) + h_{22}\delta h(k).$$

Within the context of a model following control a desired yawing angle speed $w_{ref}$ which is described by the following difference equation:

$$w_{ref}(k+1) = \Phi_{22ref} w_{ref}(k) + h_{21ref}\delta(k)$$

is to be followed with the aid of the control variable $\delta_h$. This results in the sought-after control variable:

$$\delta_{hs}^* = (1/h_{22}) \cdot (1/h_{22v}) \cdot (\Phi_{22ref} w_{ref} + h_{21ref}\delta) - \Phi_{22}w - h_{21}\delta\delta),$$

where $h_{22v}$ constitutes an adaptation coefficient. $h_{22}$, $h_{21}$, $\Phi_{22ref}$ are vehicle-specific variables and $\Phi_{22}$ and $h_{21ref}$ are selected parameters for a desired yawing angle speed $w_{ref}$.

The above controller equation can in turn be converted as follows:

$$\delta_{hs}^* = (1/h_{22})(1/h_{22v})(\Phi_{22ref}w + h_{21ref}\delta - \Phi_{22}w - h_{21}\delta) +$$

$$(1/h_{22})(1/h_{22v})\Phi_{22ref}(w_{ref} - w).$$

If the equation for $\delta^*_{hs}$ given above is compared with the equation just given it is found that:

$$\delta_{hs} = (1/h_{22})(1/h_{22v}) \cdot ((\Phi_{22ref} - \Phi_{22})w + (h_{21ref} - h_{21})\delta)$$
$$\Delta\delta_{hs} = (1/h_{22})(1/h_{22v})\Phi_{22ref}(w_{ref} - w).$$

If the fuzzy logic controller is a P controller, only the deviation $e = w_{ref} - w$ is evaluated as input variable.

Standardized input variables and output variables are taken into account. The following relations apply between the physical and standardized variables:

$e\, K_1 = e_N\, K_1 > 0$ $u_N\, K_3 = u\, K_3 > 0.$

The input variable e is standardized to a range between −10 and +10. This means $K_1$ must be selected in such a way that it satisfies the following equation:

$$e_{max} \cdot K_1 < 10.0$$

where $e_{max}$ is the maximum deviation which occurs in field tests.

In reality it has been found from vehicle trials that $e_{max}$ does not reach the value 1.0 rad/s as long as the vehicle remains stable. On the basis of these considerations, $K_1$ is selected as 10.0.

If the case occurs where $e_{max} \cdot K_1 > 10.0$, $e_{max} \cdot K_1$ is limited to 10.0.

The output variable $u(=\delta_{hs})$ is destandardized by means of the factor $K_3$.

The following applies to $K_3$:

$$u_{Nmax} \cdot K_3 < u_{max}$$

where $u_{Nmax}=6.67$ and $u_{max}=0.087$ rad, $u_{max}$ being the maximum steering angle of the rear axle. It then follows that:

$$K_3 < \frac{0.087}{6.67} = 0.013 \text{ rad.}$$

Figure 5:
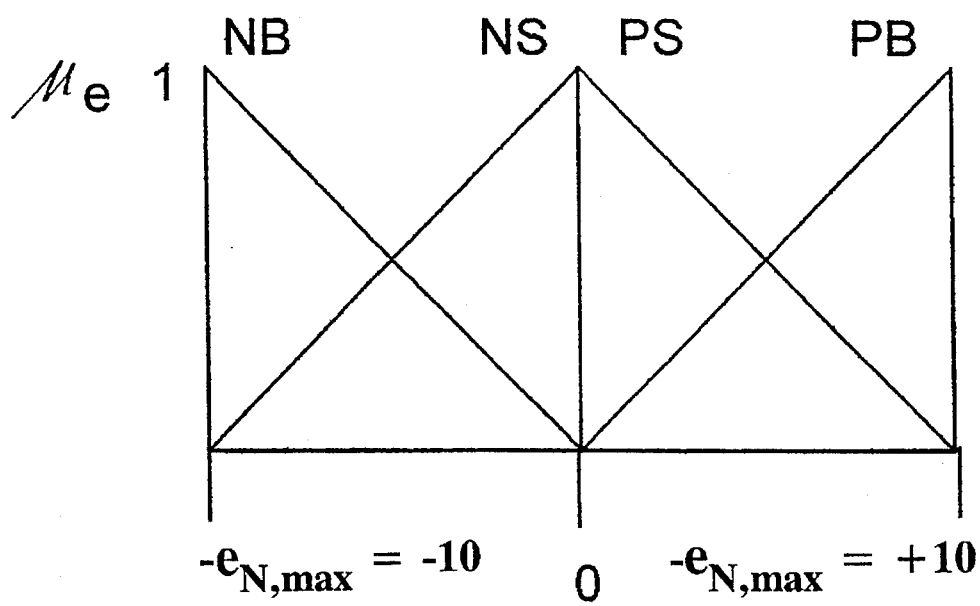
FIG. 5 is a diagram for the input e for the fuzzy rear axle P controller.

The membership functions are conceived as linear functions. The input variable e is divided into four fuzzy symmetrical sets, shown in FIG. 5:

NB=negative big
NS=negative small
PS=positive small
PB=positive big.

Figure 6:
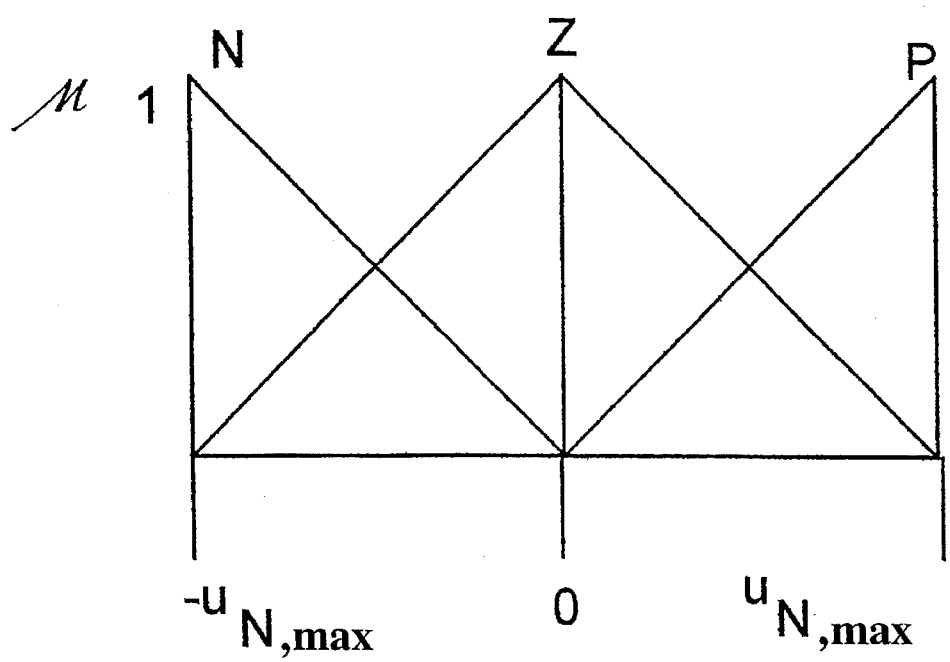
FIG. 6 is a diagram for the output u for the fuzzy rear axle P controller.

The output variable u is divided into three fuzzy symmetrical sets (FIG. 6):

N=negative
P=positive
Z=approximately zero

The rules for logically connecting the input variables and output variables are acquired from simple considerations:

| if e = PB | then u = N |
| if e = NB | then u = P |
| if e = (PS or NS) | then u = Z |

The fuzzy logic controller was developed with the development tool 'TIL-Shell' produced by Togai InfraLogic. The program code which is produced with this is converted into a C program code with the aid of a fuzzy C compiler which is also from Togai and can be included in the simulation environment.

Implementing the control algorithm on a real-time system in a vehicle makes a real-time observation necessary. There is a large potential for making savings in the fuzzy algorithm. Basically there are two possibilities available:

Optimization of the program code for on-line calculation of the control variable Determining the control variable by means of a characteristic diagram.

Mere, the first possibility is investigated.

The C code supplied by the TIL-Shell is as a rule not configured for short computing times and has to be optimized. A more effective procedure for optimizing computing time is the realization of the fuzzy logic controller in the form of analytical expressions. For the fuzzy logic P controller above, the following formula was used:

$$u = \frac{\mu_p - 1}{\mu_p + 1} r_p \text{sign}(e)$$

where $$\mu_p = 1 - (0.1 \, K_1 \, e) \, \text{sign}(e)$$

$r_p$: centroid of the initial fuzzy set positive (P) ($r_p$=6.67 for the standardization of e to −10 and +10)

under the following conditions
symmetrical sets
MAX-DOT inference
centroid method for defuzzification By means of these simple conversions, the required computing time of the FP (fuzzy D) controller can be reduced to 1/11 of the original value required with TILshell. Therefore, this implementation was used.

When a PD controller is used, the deviation e and its derivation over time e* are used to form the control variable u. The controller is systematically designed in a standardized phase plane. The phase plane is divided into domains on the basis of heuristic considerations.

Figure 7:
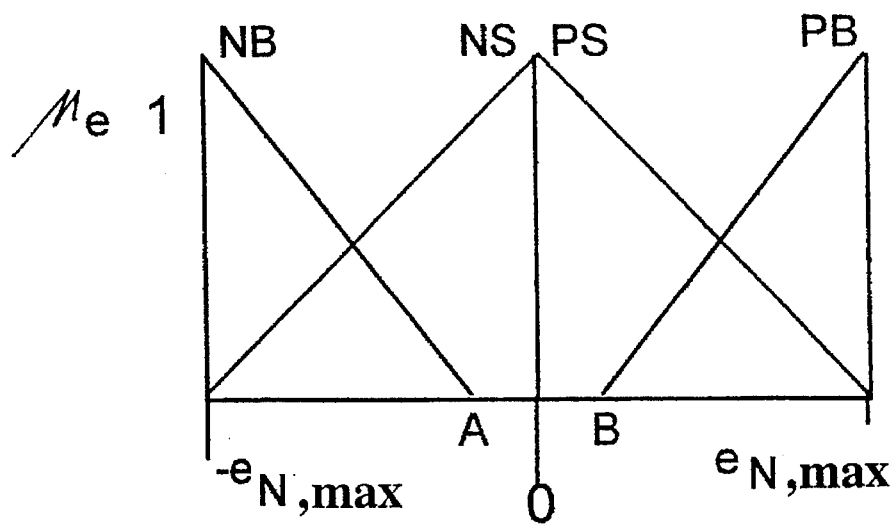
FIG. 7 is a diagram for the input e for the fuzzy rear axle PD controller.

The input variable e is divided into four fuzzy symmetrical sets (FIG. 7):

NB=negative big
NS=negative small
PS=positive small
PB=positive big.

The two points A and B lie symmetrically with respect to the straight line e=0. By displacing these points on the e-axis a deadzone for e can be realized.

Figure 8:
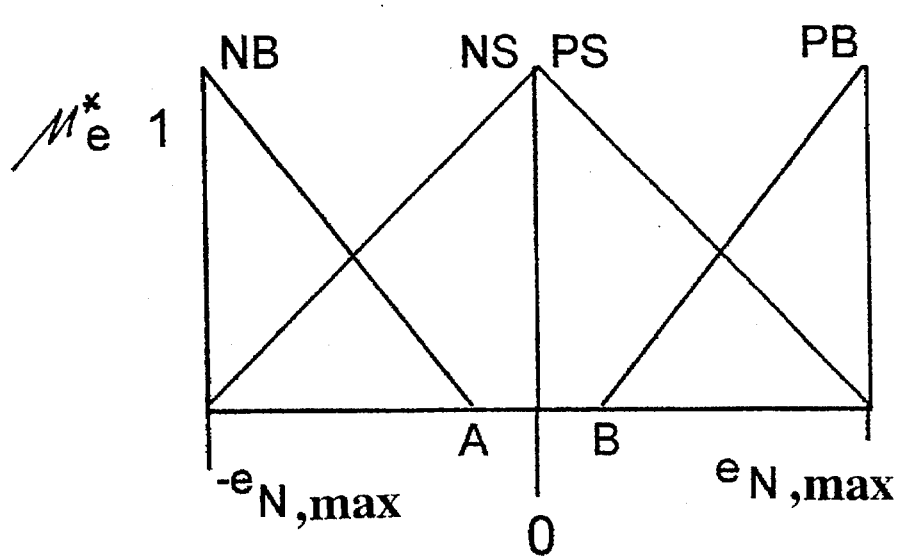
FIG. 8 is a diagram for the second input e* for the fuzzy rear axle PD controller.

The input variable e* is also divided into four fuzzy symmetrical sets (FIG. 8):

NB=negative big
NS=negative small
PS=positive small
PB=positive big.

The two points C and D lie symmetrically with respect to the straight line e*=0. By displacing these points on the e-axis a deadzone for e*-axis can be realized.

Figure 9:
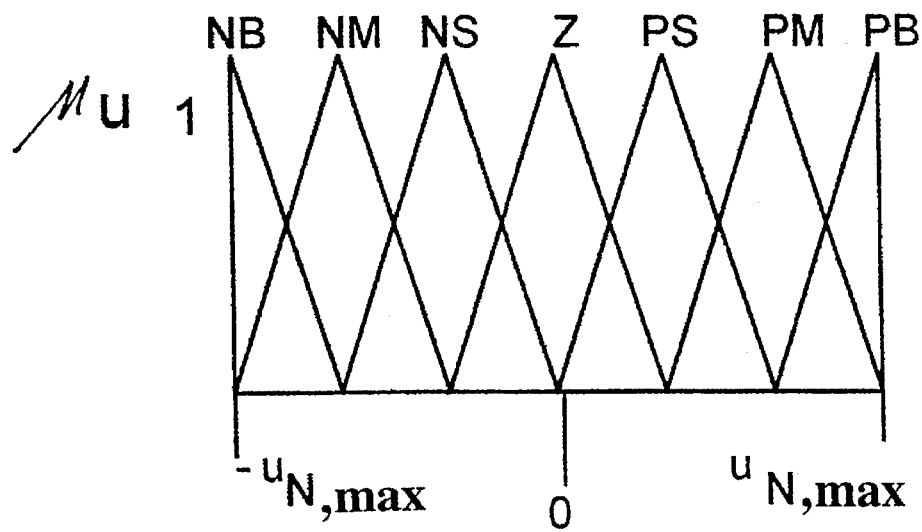
FIG. 9 is a diagram for the output u for the fuzzy rear axle PD controller.
Figure 10:
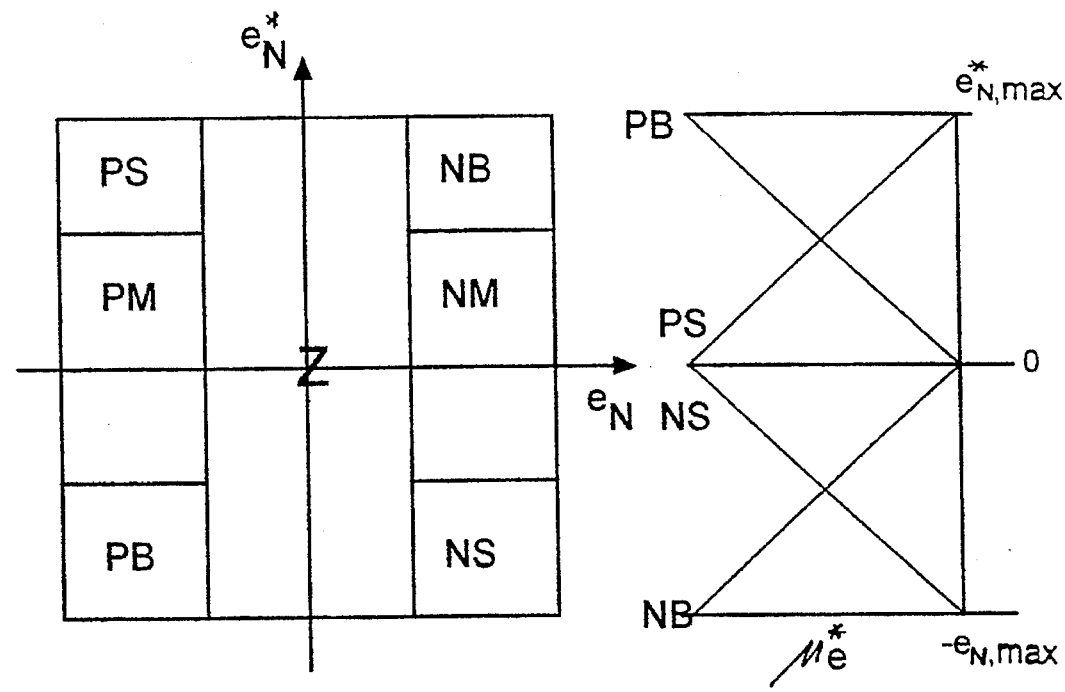
FIGS. 10A, 10B, and 10C are diagrams for designing the fuzzy rear axle PD-controller in a standardized phase plane.
Figure 10:
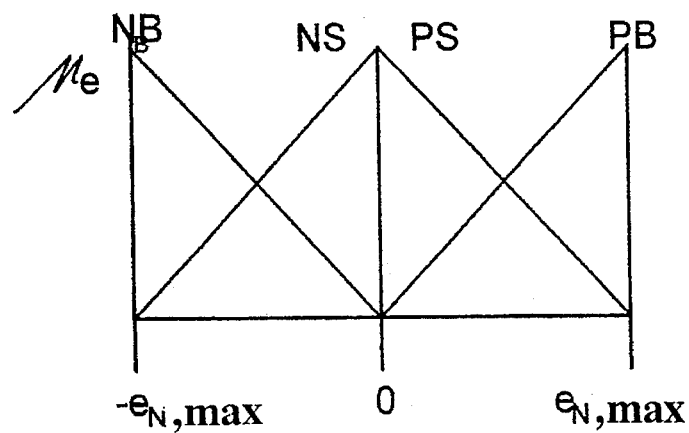

The standardized phase plane is divided into seven fuzzy domains, each domain being assigned a fuzzy initial set of the control variable u with the same name (FIG. 9 and FIG. 10):

NB=negative big
NM=negative medium
NS=negative small
Z=approximately zero
PS=positive small
PM=positive medium
PB=positive big.

The rules used are:
if e*=NB and e=NB then u=PB

| if e = NB | and e* = (PS or NS) | then u = PM |
| if e = NB | and e* = PB | then u = PS |
| if e = (PS or NS) | and e* = NB | then u = Z |

| | | |
|---|---|---|
| if e = (PS or NS) | and e* = (PS or NS) | then u = Z |
| if e = (PS or NS) | and e* = PB | then u = z |
| if e = PB | and e* = NB | then u = NS |
| if e = PB | and e* = (PS or NS) | then u = NM |
| if e = PB | and e* = PB | then u = NB. |

Standardized input variables and output variables are used for the design of the controller. The following relations apply between the physical and standardized variables:

$$e_N = e \cdot K_1 \quad K_1 > 0$$

$$e_N^* = e^* \cdot K_2 \quad K_2 > 0$$

$$u = u_N \cdot K_3 \quad K_3 > 0.$$

The input variables and output variables are standardized to ranges from −10 to +10

The standardization factors $K_1$, $K_2$ and $K_3$ are to be conceived here as controller parameters. The following values resulted from the simulation:

$$K_1 = 10$$

$$K_2 = 0.5$$

$$K_3 = 0.02 \text{ to } 0.04$$

The insertion of e* results in the controller 10 taking up more computing time in the real-time system than is provided for it.

In order to remain within the prescribed computing time, the C code of the fuzzy logic PD controller must be optimized. The possibility, already mentioned above, in the form of an analytical expression can be derived for this in a similar manner. Some definitions (e.g. symmetrical membership functions) introduced for the sake of simplicity restrict practical use. Therefore, further efforts were made in order to achieve optimization of the computing time of the fuzzy logic PD controller.

A new possible optimization is based on the idea of achieving an appreciable saving in computing expenditure by avoiding in a systematic and intelligent way operations which are redundant and not significant for respective current system states.

In the conventional procedure, eight membership values are to be calculated and nine rules are to be evaluated for the fuzzy logic PD controller in. each cycle, which, depending on the inference method used, can be very costly. From the $\mu_{\omega}$ j determined in this way, $u_N$ is now defined according to the defuzzification method used, which can also constitute considerable expenditure.

The gain in computing time which can be achieved with the aforementioned methodology results predominantly from avoiding redundant (computing) operations as a function of the respectively current (during the operating time) system state. For example, the interpretation of specific rules which can be associated with a specific system state may be dispensed with in certain circumstances if it is already known that the system to be controlled is momentarily in a completely different region of the state space. The limitation of these regions of the state space with respect to one another is determined here from the fuzzy control base.

It is obvious for this strategy to be set out in an algorithmic form, such as for example as a program in a procedural programming language. This algorithm represents a binary decision tree on whose branches only closed algebraic expressions for the new values, to be determined, of the output variables still have to be evaluated. As a function of the respectively current system state, the output variables of the controller are determined in a different way, i.e. by evaluating other selected control steps.

The two controllers 5 and 10 simultaneously evaluate the deviation of the yawing angle speed and operate with the same priority. The suitable weighting is to be distributed between the steering (factor $d\_K_3$) and the braking (factor $d\_K_3\_BRG$) with the aid of an adaptation (FUZZY_ADAPTATION) which evaluates the longitudinal acceleration and lateral acceleration. Thus, the road-friction potential for longitudinal and lateral dynamics are to be better utilized. The control variables which are modified with the weighting factors are then:

$$\Delta\delta^*_{hs} = d\_K_3 \Delta\delta_{hs}$$

$$\Delta\lambda^*_{is} = d\_K_3\_BRG \cdot \Delta\lambda_{is}$$

$$\Delta P^*_{is} = d\_K_3\_BRG \cdot \Delta P_{is}$$

where $$0 \leq d\_K_3 \leq 1$$

$$0 \leq d\_K_3\_BRG \leq 1$$

At the $(x_1, x_2)$ level with the variables $$x_1 = b_x^2 + b_y^2$$

$$x_2 = \text{Abs}(b_x/b_y)$$

$b_x$ = longitudinal acceleration
$b_y$ = lateral acceleration
Abs = absolute it is appropriate to define the divisions of the domain for $d\_K_3\_BRG$. FIG. 11 then shows the rules for determining $d\_K_3\_BRG$. The membership functions used for $x_1$, $x_2$ and $d\_K_3\_BRG$ are given in FIGS. 12 to 14.

The following then applies for the rear-axle steering $$d\_K_3 = 1 - d\_K_3\_BRG$$

We claim:
1. Vehicle dynamics control system for a vehicle having wheels, said system comprising
   means for determining desired slip values $\lambda_{is}$ for said wheels,
   means for determining actual slip values $\lambda_i$ at said wheels,
   an antilock controller which determines first desired pressure values $P_{is}$ by comparing said actual slip values $\lambda_i$ to said desired slip values $\lambda_{is}$,
   means for determining the front axle steering angle $\delta$,
   means for determining the yaw speed w,
   a fuzzy logic brake controller which determines correction values $\Delta P_{is}$ in dependence on the front steering angle $\delta$ and the yaw speed w,
   adding means for determining second desired pressure values $P^*_{is}$ according to $P^*_{is} = P_{is} + \Delta P_{is}$,
   a pressure controller for generating brake pressure control signals in dependence on said second desired pressure values $P^*_{is}$, and
   brake control valves responsive to said brake pressure control signals.

2. The vehicle dynamic control system as claimed in claim 1, wherein the said system additionally comprises a rear-axle steering controller.

3. The vehicle dynamic control system as claimed in claim 2, wherein the rear-axle steering controller is a model-following controller with a control component and a fuzzy logic steering controller, the control component producing a first desired rear-axle steering angle $\delta_{hs}$ which depends on the front-wheel steering angle $\delta$ and the yawing speed w, and the fuzzy logic steering controller producing a correction value $\Delta\delta_{hs}$ from which a second desired value $\delta^*_{hs}=\delta_{hs}+\Delta\delta_{hs}$ is produced, and wherein the set value is desired by means of a steering angle controller.

4. The vehicle dynamic control system as claims in claim 3 wherein said fuzzy logic brake controller modifies the correction value $\Delta P_{is}$ by means of weighting value dK3 BRG for braking, and said fuzzy logic steering controller modifies the correction value $\Delta\delta_{hs}$ by means of weighting value dK3 for steering, the weighting values lying between 0 and 1.

5. The vehicle dynamic control system as claimed in claim 4, wherein the weighting values are determined by means of fuzzy logic.

6. The vehicle dynamic control system as claimed in claim 1 further comprising means for determining the vehicle speed, means for determining desired yaw speed $w_{ref}$ based on the front axle steering angle $\delta$ and the vehicle speed, and means for generating an input variable $e=w_{ref}-w$ for said fuzzy logic brake controller, said fuzzy logic brake controller standardizing said input variable e in a range from $-1$ to $+1$ and dividing it into the following four fuzzy symmetrical sets:

$e_n$=NB (negative big)
$e_n$=NS (negative small)
$e_n$=PS (positive small)
$e_n$=PB (positive big), said fuzzy logic brake controller determining said correction values $\Delta P_{is}$ in dependence on said standardized input vehicle variable $e_n$.

7. The vehicle dynamic control system as in claim 6 wherein said fuzzy logic brake controller determines an output variable BRA based on said standardized input variable $e_n$ and said front axle steering angle $\delta$, and standardizes said output variable BRA in a range from $BRA_{min}$ to $BRA_{max}$ and divides it into the following four fuzzy symmetrical sets $BRA_N$=NB (negative big)
$BRA_N$=NS (negative small)
$BRA_N$=PS (positive small)
$BRA_N$=PB (positive big)

said fuzzy logic brake controller determining said correction values $\Delta P_{is}$ in dependence on said standardized output variable $BRA_N$.

8. Vehicle dynamics control system for a vehicle having wheels, said system comprising means for determining first desired slip values $\lambda_{is}$ for said wheels, means for determining actual slip values $\lambda_i$ at said wheels, means for determining the front axle steering angle $\delta$, means for determining the yaw speed w, a fuzzy logic brake controller which determines correction values $\Delta\lambda_{is}$ in dependence on the front steering angle $\delta$ and the yaw speed w, adding means for determining second desired slip values $\lambda^*_{is}$ according to $\lambda^*_{is}=\lambda_{is}+\Delta\lambda_{is}$, an anti-lock controller which determines desired pressure values $P_{is}$ by comparing said actual slip values $\lambda_i$ with said second desired slip values $\lambda^*_{is}$, a pressure controller for generating brake pressure control signals in dependence on said desired pressure values $P_{is}$, and brake control valves responsive to said brake pressure control signals.

9. The vehicle dynamic control system as claimed in claim 8 further comprising means for determining the vehicle speed, means for determining desired yaw speed $w_{ref}$ based on the front axle steering angle $\delta$ and the vehicle speed, and means for generating an input variable $e=w_{ref}-w$ for said fuzzy logic brake controller, said fuzzy logic brake controller standardizing said input variable e in a range from $-1$ to $+1$ and dividing it into the following four fuzzy symmetrical sets:

$e_n$=NB (negative big)
$e_n$=NS (negative small)
$e_n$=PS (positive small)
$e_n$=PB (positive big), said fuzzy logic brake controller determining said correction values $\Delta\delta_{is}$ in dependence on said standardized input variable $e_n$.

10. The vehicle dynamic control system as in claim 9 wherein said fuzzy logic brake controller determines an output variable BRA based on said standardized input variable $e_n$ and said front axle steering angle $\delta$, and standardizes said output variable BRA in a range from $BRA_{min}$ to $BRA_{max}$ and divides it into the following four fuzzy symmetrical sets $BRA_N$=NB (negative big)
$BRA_N$=NS (negative small)
$BRA_N$=PS (positive small)
$BRA_N$=PB (positive big)

said fuzzy logic brake controller determining said correction values $\Delta\lambda_{is}$ in dependence on said standardized output variable $BRA_N$.

11. The vehicle dynamic control system as claimed in claim 8, wherein the said system additionally comprises a rear-axle steering controller.

12. The vehicle dynamic control system as claimed in claim 11, wherein the rear-axle steering controller is a model-following controller with a control component and a fuzzy logic steering controller, the control component producing a first desired rear-axle steering angle $\delta_{hs}$ which depends on the front-wheel steering angle $\delta$ and the yawing speed w, and the fuzzy logic steering controller producing a correction value $\Delta\delta_{hs}$ from which a second set value $\delta^*_{hs}=\delta_{hs}+\Delta\delta^{hs}$ is produced, and wherein the desired value is set by means of a steering angle controller.

13. The vehicle dynamic control system as claimed in claim 12 wherein said fuzzy logic brake controller modifies the correction value $\Delta\lambda_{is}$ by means of weighting dK3_BRG for braking, and said fuzzy logic steering controller modifies the value $\Delta\delta_{hs}$ by the weighting value dK3 for steering, the weighting values lying between 0 and 1.

14. The vehicle dynamic control system as claimed in claim 13, wherein the weighting values are determined by means of fuzzy logic.

* * * * *